United States Patent Office 3,146,005
Patented Aug. 25, 1964

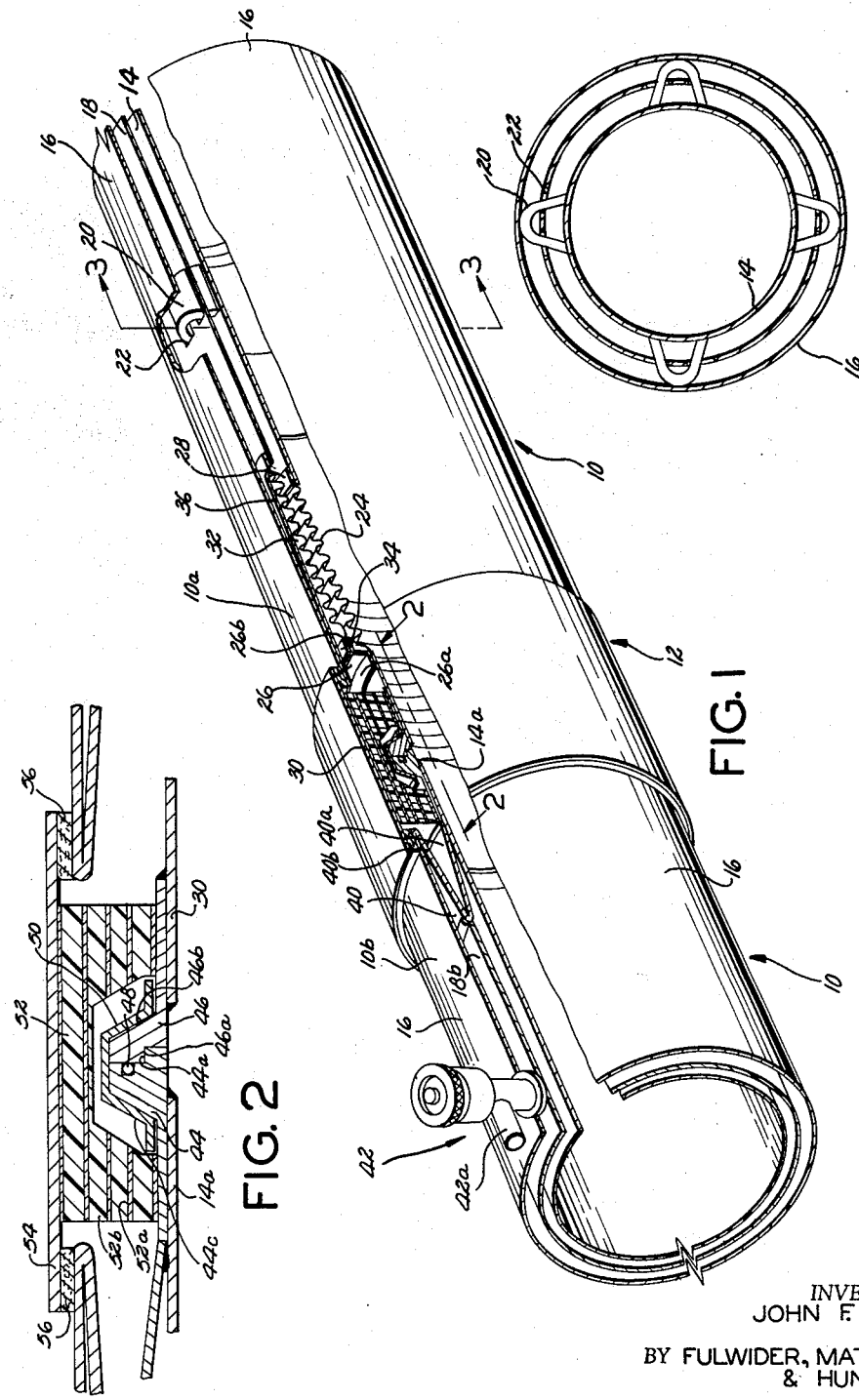
Aug. 25, 1964 — J. F. PEYTON — 3,146,005
VACUUM INSULATED CONDUITS AND INSULATED JOINING MEANS
Filed Dec. 4, 1961
INVENTOR.
JOHN F. PEYTON
BY FULWIDER, MATTINGLY
& HUNTLEY
ATTORNEYS

3,146,005
VACUUM INSULATED CONDUITS AND INSULATED JOINING MEANS
John F. Peyton, Los Angeles, Calif., assignor to Arrowhead Products, Los Alamitos, Calif., a corporation of California
Filed Dec. 4, 1961, Ser. No. 156,864
6 Claims. (Cl. 285—47)

The present invention relates generally to insulated conduits, but more particularly to conduits having vacuum jackets for providing the desired qualities of insulation.

In the transmission of relatively high or relatively low temperature fluids, it is necessary to employ transmission means which will not permit the free exchange of heat between the fluid within the transmission means and the atmospheric conditions external thereof. To accomplish this, conduits are employed which have extremely effective temperature insulating means. The need for temperature insulated conduits is particularly apparent today in the field of cryogenics having to do with the science of refrigeration, with particular reference to methods for producing very low temperatures. For instance, what with the present day importance of missiles and rockets, it has been discovered that some of the most effective fuels for operating rocket motors and the like have extremely low temperatures. In this regard, liquid oxygen has been found very useful and is approximately 300 degrees below zero, whereas liquid hydrogen, also very desirable, approximates 400 degrees below zero.

Although a vacuum has been found to be the most effective means of heat insulation, the application thereof to conduits has heretofore presented certain problems. Since the provision of a vacuum about a conduit necessitates an outer shell which is coaxially arranged with respect to the conduit and is attached thereto at either end to provide a hermetically sealed jacket, it frequently resulted that due to the relative temperatures of the inner and outer shells considerable difference of expansion resulted. This causes structural damage or harm to the insulating characteristics of the system.

Incidental to this problem has been the fact that when the inner and outer shells are joined together to make an hermetically sealed jacket, a highly conductive path is generally provided through the end wall sealing members. This also contributes to the transfer of heat between the interior and the exterior of the conduit.

To overcome the above and other shortcomings of prior art structures, it is an object of the present invention to provide vacuum jacket insulated conduits which are substantially immune to malfunction due to differences in expansion of the inner and outer shells.

Another object of the present invention is to provide vacuum jacket insulated conduits which include expansion means for permitting relative movement of the inner and outer shells.

Another object is to provide vacuum jacket insulated conduits as characterized above wherein the relative expansion permitting means also constitutes an end wall of the vacuum jacket and is found to have relatively low heat conductivity.

Another object of this invention is to provide vacuum jacket insulated conduits as characterized above wherein the expansion permitting means is so formed as to have a relatively long heat path and hence is ineffective for conducting heat between the interior and exterior of the conduit.

Another object is to provide vacuum jacket insulated conduits in which the flexible movement members are substantially impervious to damage due to rough handling and the like during installation.

Another object is to provide sections of conduits as characterized above which can be contiguously arranged to provide a conduit of substantially any desired length.

Another object of this invention is to provide conduit sections as characterized above which can be individually evacuated before being transported and assembled at the job site.

Another object of this invention is to provide heat insulated conduits as characterized above which are simple and inexpensive to manufacture and which are rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 1 is a fragmentary perspective view of a portion of conduit according to the present invention;

FIGURE 2 is an enlarged sectional view taken substantially along line 2—2 of FIGURE 1; and FIGURE 3 is a sectional view taken substantially along line 3—3 of FIGURE 1.

Like reference characters indicate corresponding parts throughout the several views of the drawings.

Referring to FIGURE 1 of the drawings, there is shown therein a portion of a conduit formed in accordance with the present invention. Such conduit comprises a plurality of contiguously arranged sections of vacuum jacketed ducts or conduits as identified by the numeral 10. The sections 10 are connected together by insulated joints or connectors as shown at 12.

As will hereinafter be explained in detail, each section 10 of the conduit is provided with a separate vacuum jacket to facilitate evacuation thereof prior to shipment to a job site. Also, the individual sections permit the conduit to be transported in a convenient manner, and to be assembled to the desired length.

Each section 10 is provided with coaxially arranged inner and outer tubular members or shells as shown at 14 and 16, respectively. Between shells 14 and 16 is a tubular member 18 which may be provided with a highly polished surface for reflecting radiant heat. Member 18 may be formed of one or more layers of aluminum foil or the like, or it may be constructed of other material to which has been applied a thin coating of aluminum or other highly reflective substance.

To maintain tubular member 18 substantially equidistant from the inner and outer tubular members 14 and 16 any one of various types of retaining means may be employed. In the embodiment shown in the drawings there is provided four equiangularly spaced brackets 20 which extend through suitable openings 22 in tubular member 18 and resiliently engage or rest against the inner and outer shells. This particular arrangement is particularly advantageous for airborne ducting which must of necessity be of minimum weight.

Each conduit section 10 is formed with an end portion 10a formed with means for permitting relative movement between the inner and outer shells 14 and 16. Also, each section includes an end portion 10b which is substantially rigid in construction as will hereinafter appear. End portion 10a comprises a cylindrically shaped pleated or corrugated expansible tubular member 24, one end of which is sealingly fastened to member 14 as by welding, brazing, soldering or the like.

The other end of flexible member 24 is positioned between one end 26a of a Z-shaped member 26 and a tubular connecting member 30 which is contiguous with respect to member 24. While thus assembled, the end of member 24 is sealingly fastened to members 26 and 30 as by seam welding or any other suitable process.

Another tubular pleated or corrugated member 32 of diameter slightly larger than that of expansible member 24 is hermetically fastened to the other end 26b of Z-shaped member 26 and to one end of tubular member 18. An annular sealing ring 34 may be positioned on expansible member 32 at member 26 to facilitate the provisions of a hermetic seal by welding or any other appropriate process.

Extending from member 32 to the end of outer shell 16 is a tapered tubular member 36 which is fastened to such members at its opposite ends to provide a hermetic seal therebetween.

The opposite end 10b of conduit section 10 is formed in a somewhat different manner. An annular end member or wall 40 having a substantially V-shaped cross-section or other shape to provide a long heat path, is positioned between the inner and outer shells 14 and 16, with the annular edge 40a thereof a predetermined distance from the end 14a of inner shell 14. When so positioned, edge 40a is welded or otherwise joined to shell 14 to provide a hermetic seal therebetween. The outer annular edge 40b of end wall member 40 is welded or otherwise secured to the end of outer shell 16 to effect a hermetic seal therebetween. To further aid in positioning tubular member 18 between inner and outer shells 14 and 16, an end portion 18b thereof is attached in any desired manner to the vertex of the V-shaped cross-section of end wall member 40. As will be readily apparent, this connection need not be a hermetic seal since the vertex of end wall member 40 is closed at this point.

A suitable valve member 42 is mounted on each of the outer tubular members 16, such valve means having a connector 42a for connection thereof by suitable tubing (not shown) to apparatus for evacuating the jacket provided between inner and outer shells 14 and 16.

Conduit sections 10 can be readily assembled in contiguous arrangement at the job site through the use of suitable connectors as shown at 12. Each connector 12 comprises an annular connecting member 44 welded on end portion 14a of inner tube 14 and a complementally formed annular connecting member 46 welded to tubular end member 30. As shown in FIGURE 2, connecting members 44 and 46 are formed with complementally shaped annular steps or shoulders 44a and 46a, respectively, to facilitate firm connection between adjacent conduit sections 10. The particular joint shown uses an O-ring type seal 48. However, this is only for illustration since there are many types of joints, all of which are usable with the jacketing structure of the present invention.

Each of the members 44 and 46 is formed with an annular tapered or beveled surface as at 44c and 46b, respectively. A sheet metal strap or band 50 having a substantially V-shaped cross-section is clamped about the connecting members 44 and 46 for cooperation with the beveled surfaces 44c and 46b to draw the adjacent conduit sections together by suitable clamping means (not shown) thereby creating a hermetic seal therebetween by compression of O-ring 48.

Mounted over sheet metal strap 50 is an annular insulating member 52 composed of alternate sections of aluminum foil 52a and Fiberglas 52b. Such construction of member 52 will reflect radiant heat and will greatly impede the conduction of heat energy. Also, it eliminates the added cost and inconvenience of a separate vacuum jacketed flange cover. This system is possible because of the very short length of inner duct exposed in the flange area. On top of insulating member 52 is mounted a sheet metal band 54, there being annular elastomeric sealing gaskets 56 between each end thereof and the adjacent end portion of outer shell 16. Sheet metal band 54 is provided with suitable fastening means (not shown) to enable the entire insulating connector to be firmly fastened about the joint between the adjacent conduit sections.

As set forth above, the annular space or jacket afforded by the inner and outer shells 14 and 16 can be evacuated prior to delivery thereof to the job site.

After the conduit sections are assembled as shown, fluid may be permitted to flow therethrough. As the inner shell 14 is caused to assume the temperature of such fluid it will expand or contract relative to the outer shell 16. However, such relative movement will be absorbed by the tubular expansible section 24 fixed to one end of shell 14. Due to this feature, of course, such relative movement will not create undue stresses at the joints or seams of the various members.

Corrugated member 32 affords a relatively long heat path between the inner shell 14 and the other tubular members. As such, the heat conductivity between the interior of the conduit and the exterior thereof is held to a minimum. A similar feature is provided at the other end of each conduit section 10 since end wall member 40 affords a relatively long heat path due to its V-shaped cross-section. It is thus seen that the opposite ends of each conduit section 10 are hermetically sealed to permit evacuation of the jacket around inner shell 14, while nonetheless affording extremely poor paths for conducting heat energy.

Intermediate tubular member 18, due to its highly reflective surface, will repel the heat energy which will tend to radiate from one to the other of the interior and exterior portions of the conduit.

It should be particularly noted that the above features are provided while using an outer shell 16 which is solid or uninterrupted throughout its length. That is, the more fragile members of the conduit assembly, such as expansible members 24 and 32, are positioned well within the outer shell 16 for adequate protection thereby from outside obstacles. For instances, such arrangement affords sufficient strength throughout the length of each conduit section 10 to enable workmen to stand thereon or for tools and other objects to be inadvertently dropped thereon without injuring the entire conduit.

It is thus seen that the present invention provides a novel insulated conduit which is particularly well adapted for transmission of fluids of extremely high or extremely low temperatures.

Although I have shown and described certain specific embodiments of my invention, I am fully aware that many modifications thereof are possible. The invention itself therefore is not to be restricted except insofar as is necessitated by the prior art and by the spirit of the appended claims.

I claim:
1. Insulated conduit comprising, an inner tubular member for transmission therethrough of fluids, an outer tubular member coaxially disposed about said inner member to provide an annular space therebetween, an intermediate tubular member for reflecting radiant heat energy, means for positioning said intermediate tubular member within said space in spaced relation to said inner and outer members, closure means for the opposite ends of said annular space comprising individual annular walls sealingly connected to each of said inner and outer members, each of said walls being formed with a substantially V-shaped cross-section to provide a relatively long heat conducting path between said inner and outer members, means for evacuating said annular space, and flexible tubular means interposed in said inner member for permitting relative movement of the latter with respect to the other of said tubular members upon passage therethrough of a given fluid.

2. Insulated conduit according to claim 1 wherein each of said walls is connected to said intermediate tubular member to support the same.

3. Insulated conduit according to claim 1 wherein said positioning means comprises a plurality of brackets each of which is substantially U-shaped and has its opposite ends in engagement with said inner tubular member and its intermediate portion in engagement with said outer tubular member.

4. Insulated conduit comprising, an inner tubular member for transmission therethrough of fluids of extreme temperatures, an outer tubular member coaxially disposed about said inner member to provide an annular space therebetween, an intermediate tubular member for reflecting radiant heat energy, a plurality of brackets angularly disposed about said annular space and including means engageable with said intermediate tubular member for positioning the latter within said space in spaced relation to said inner and outer members, closure means for the opposite ends of said annular space comprising an annular wall sealingly connected to each of said inner and outer members and being formed with a substantially V-shaped cross-section, said wall being connected to said intermediate tubular member and including an expansible member to simultaneously permit of relative movement between said inner tubular member and said intermediate member and provide a relatively long heat conducting path therebetween, and means for evacuating the annular space between said inner and outer member.

5. Insulated conduit comprising, an inner tubular member for transmission therethrough of fluids, an outer tubular member coaxially disposed about said inner member to provide an annular space therebetween, an intermediate tubular member provided with a surface for reflecting radiant heat energy, a plurality of brackets angularly disposed about said annular space and including means engageable with said intermediate member for positioning the latter within said space in spaced relation to said inner and outer members, closure means for the opposite ends of said annular space comprising at least one annular wall sealingly connected to each of said inner and outer members and formed with a substantially V-shaped cross-section, said wall being connected to said intermediate tubular member at the vertex of its V-shape, there being tubular corrugated expansion means in said wall between said inner and intermediate walls to provide a relatively long heat conducting path therebetween while permitting relative movement therebetween, means for evacuating the annular space between said inner and outer members, and tubular expansible means interposed in said inner member for permitting relative movement of the latter with respect to the outer tubular member, both of said tubular expansible means being protected from external forces by said outer tubular member.

6. Insulated conduit comprising, a plurality of contiguously arranged conduit sections, and a connector interposed between each pair of adjacent conduit sections providing an insulated fluid-tight connection therebetween, each of said conduit sections comprising an inner tubular member connected at each end to a separate one of said connectors for transmission therethrough of fluids, an outer tubular member coaxially disposed about said inner member to provide an annular space therebetween and connected at its opposite ends to said connectors, an intermediate tubular member for reflecting radiant heat energy, a plurality of brackets angularly disposed about said annular space and including means engageable with said intermediate tubular member for positioning the latter within said space in spaced relation to said inner and outer members, closure means for the opposite ends of said annular space comprising individual annular walls sealingly connected to each of said inner and outer members, each of said walls being formed with a substantially V-shaped cross-section to provide a relatively long heat conducting path between said inner and outer members, means for evacuating said annular space, and flexible tubular means interposed in said inner member for permitting relative movement of the latter with respect to the other of said tubular members upon passage therethrough of a given fluid.

References Cited in the file of this patent

UNITED STATES PATENTS

| | | |
|---|---|---|
| 1,140,633 | Trucano | May 25, 1915 |
| 1,218,895 | Porter | Mar. 13, 1917 |
| 2,785,536 | Hinckley | Mar. 19, 1957 |
| 2,962,053 | Epstein | Nov. 29, 1960 |
| 3,042,430 | Guy | July 3, 1962 |
| 3,068,026 | McKamey | Dec. 11, 1962 |